(12) United States Patent
Kim

(10) Patent No.: US 12,276,448 B2
(45) Date of Patent: Apr. 15, 2025

(54) METHOD FOR MANUFACTURING AUGER-TYPE ICE MAKER AND THE MANUFACTURED AUGER-TYPE ICE MAKER

(71) Applicant: BLUENIX Co., Ltd., Ansan-si (KR)

(72) Inventor: Doo Ha Kim, Incheon (KR)

(73) Assignee: BLUENIX Co., Ltd., Ansan-si (KR)

( * ) Notice: Subject to any disclaimer, the term of this patent is extended or adjusted under 35 U.S.C. 154(b) by 230 days.

(21) Appl. No.: 18/052,261

(22) Filed: Nov. 3, 2022

(65) Prior Publication Data
US 2024/0019187 A1    Jan. 18, 2024

(30) Foreign Application Priority Data
Jul. 18, 2022   (KR) .................. 10-2022-0088062

(51) Int. Cl.
*F25C 1/147*       (2018.01)
*B23K 1/00*        (2006.01)
(Continued)

(52) U.S. Cl.
CPC ............ *F25C 1/147* (2013.01); *B23K 1/0012* (2013.01); *B23K 31/02* (2013.01); *B23P 15/26* (2013.01)

(58) Field of Classification Search
CPC ....... F25C 1/147; B23K 1/0012; B23K 31/02; B23P 15/26
See application file for complete search history.

(56) References Cited

U.S. PATENT DOCUMENTS

| | | | |
|---|---|---|---|
| 4,739,630 A * | 4/1988 | Tandeski ................. | F25C 1/147 228/183 |
| 4,984,360 A * | 1/1991 | Sather ..................... | F25C 1/147 72/142 |

(Continued)

FOREIGN PATENT DOCUMENTS

| | | |
|---|---|---|
| JP | H09229517 A | 9/1997 |
| JP | 2001342579 A | 12/2001 |

(Continued)

OTHER PUBLICATIONS

KR_20020028059_A English Translation (Year: 2002).*
(Continued)

*Primary Examiner* — Jason L Vaughan
(74) *Attorney, Agent, or Firm* — Renner, Otto, Boisselle & Sklar, LLP.

(57) ABSTRACT

According to an embodiment of the present disclosure, a method for manufacturing an auger-type ice maker including an ice-making tube, an auger, a refrigerant pipe, and a metal core material, includes heating and feeding the metal core material to the ice-making tube; winding the metal core material together with the refrigerant pipe around the ice-making tube; and heating a welding agent through an internal space of the ice-making tube to perform adhesion between the metal core material and both of the refrigerant pipe and the ice-making tube, wherein, in the winding the metal core material together with the refrigerant pipe on the ice-making tube, the heated metal core material is pressurized by pressure of winding the refrigerant pipe around the ice-making tube, to completely fill the spiral space with the heated metal core material, or to form a uniform interval in the spiral space.

6 Claims, 7 Drawing Sheets

(51) Int. Cl.
  *B23K 31/02* (2006.01)
  *B23P 15/26* (2006.01)

(56) References Cited

U.S. PATENT DOCUMENTS

| | | | | |
|---|---|---|---|---|
| 5,069,382 A | * | 12/1991 | Misiak | B21C 37/122 |
| | | | | 228/184 |
| 6,619,067 B2 | * | 9/2003 | Hiramatsu | F25C 5/142 |
| | | | | 62/354 |
| 6,877,334 B2 | * | 4/2005 | Hiramatsu | F25C 1/147 |
| | | | | 29/527.3 |
| 2016/0370035 A1 | * | 12/2016 | Höfer | F28F 1/02 |

FOREIGN PATENT DOCUMENTS

| | | | | | |
|---|---|---|---|---|---|
| JP | 2007057205 | A | | 3/2007 | |
| KR | 20020028059 | A | * | 4/2002 | ............. F25C 1/147 |
| KR | 20020033009 | A | * | 5/2002 | ............. F25C 1/147 |
| KR | 20020033010 | A | * | 5/2002 | ............. F25C 1/147 |
| KR | 10-0384812 | B1 | | 5/2003 | |
| KR | 20030069463 | A | * | 8/2003 | ............. F25C 1/147 |
| KR | 20110126309 | A | * | 11/2011 | ............... F25C 1/10 |
| KR | 10-2046800 | B1 | | 11/2019 | |
| KR | 102235287 | B1 | | 4/2021 | |

OTHER PUBLICATIONS

KR_20020033009_A English Translation (Year: 2002).*
KR_20020033010_A English Translation (Year: 2002).*
KR_20030069463_A English Translation (Year: 2003).*
KR_20110126309_A English Translation (Year: 2011).*

* cited by examiner

METHOD FOR MANUFACTURING AUGER-TYPE ICE MAKER AND THE MANUFACTURED AUGER-TYPE ICE MAKER

CROSS-REFERENCE TO RELATED APPLICATION(S)

This application claims benefit of priority to Korean Patent Application No. 10-2022-0088062 filed on Jul. 18, 2022 in the Korean Intellectual Property Office, the disclosure of which is incorporated herein by reference in its entirety.

BACKGROUND

1. Field

The present disclosure relates to an auger-type ice maker, and more particularly, to a method for manufacturing an auger-type ice maker that completely bonds an outer circumferential surface of an ice-making tube and a refrigerant pipe in an ice-making unit, and to an auger-type ice maker manufactured using the same.

2. Description of Related Art

The prior art related to an ice-making unit of an auger-type ice maker discloses suppling ice-making water to an ice-making tube having an auger installed therein, circulating a refrigerant through a refrigerant pipe mounted on an outer circumferential surface of the ice-making tube to generate ice, and driving the auger to recover the generated ice.

When a refrigerant pipe 120 having a circular shape is spirally wound around an ice-making tube 110 having a circular shape, as illustrated in portion (a) of FIG. 1, an empty space 10 may be formed between a refrigerant pipe 120 and an ice-making tube 110, adjacent to each other, a contact area of the refrigerant pipe 120 may decrease, while thermal conductivity may decrease, to reduce ice-making performance.

Therefore, in the prior patent document, as illustrated in portion (b) of FIG. 1, a metal wire 14 having a suitable shape and a suitable thickness, sufficient to almost completely fill a cross-section of which an empty space 10 is present between a refrigerant pipe 120, spirally wound and to which another refrigerant pipe 120 is adjacent, and an ice-making tube 110, may be installed in the empty space 10, and in this state, the refrigerant pipe 120 may be fixed to the ice-making tube 110 by soldering.

In the method of fixing by soldering, an opening of the ice-making tube 110 and an opening of the refrigerant pipe 120 in the ice-making unit 100 may be sealed, the ice-making unit 100 of the auger-type ice maker may be immersed in a solder barrel in which molten lead is disposed, a soldered portion was formed by penetrating lead into a gap 11 of the empty space, not completely filled by the metal wire between the refrigerant pipe 120 and an outer circumferential surface of the ice-making tube 110. Accordingly, a contact area between the refrigerant pipe 120 and the ice-making tube 110 may increase to improve heat transfer efficiency.

However, in the ice-making unit 100 of the prior patent document, since the refrigerant pipe 120 inserted into and fitted to the ice-making tube 110 is formed to have a tight spiral coil spring shape, there may not be a sufficient gap into which molten lead penetrates between the refrigerant pipes 120 and between the refrigerant pipe 120 and the ice-making tube 110. Accordingly, the molten lead may not penetrate into the gap 11 of the empty space not completely filled by the metal wire during a soldering operation in a short time.

In addition, since a gap between the ice-making tube 110 and the refrigerant pipe 120, to be bonded, may not be constant, the ice-making tube 110 and the refrigerant pipe 120, manufactured using the method of the prior patent document, may not be bonded properly, even though the bonding is performed with molten lead.

Accordingly, in order for a space between the refrigerant pipe 120 and the ice-making tube 110 to be filled and soldered with lead, a separate molten lead immersion process should be performed, and the molten lead immersion time should be maintained for a long time, or even when maintained for a long time, there may be cases in which the molten lead does not penetrate into and is not charged in a space between the refrigerant pipe 120 and the ice-making tube 110 due to viscosity of the molten lead.

That is, when molten lead is used, a molten lead immersion process should be additionally performed, in addition to a process of winding the refrigerant pipe 120 around the ice-making tube 110. In this case, it is difficult to completely fill an empty space 10 between the refrigerant pipe 120 and the ice-making tube 110, to generate a gap 11, not filled with the molten lead, in the empty space 10. Therefore, although the refrigerant pipe 120 is formed to have a spiral shape while tightly contacting the ice-making tube 110, to increase a contact area with the ice-making tube 110, as an area of a connection portion connecting the refrigerant pipe 120 and the ice-making tube 110 is reduced, heat transfer efficiency may be lowered, and thus a time period required for ice-making may be increased.

SUMMARY

In order to solve the problems of the prior art, the present disclosure provides a method for manufacturing an auger ice maker that completely bonds a refrigerant pipe spirally wound around and fixed to an outer circumferential surface of an ice-making tube in an auger-type ice maker to the ice-making tube uniformly without an empty space, and the auger-type ice maker manufactured thereby.

According to an aspect of the present disclosure, a method for manufacturing an auger-type ice maker including an ice-making tube, an auger installed coaxially in the ice-making tube, a refrigerant pipe spirally wound around and tightly fixed to an outer surface of the ice-making tube, and a metal core material filling a spiral space formed between the ice-making tube and the refrigerant pipe adjacent to the ice-making tube, includes heating and feeding the metal core material to the ice-making tube; winding the metal core material together with the refrigerant pipe around the ice-making tube; and heating a welding agent through an internal space of the ice-making tube to perform adhesion between the metal core material and both of the refrigerant pipe and the ice-making tube, wherein, in the winding the metal core material together with the refrigerant pipe on the ice-making tube, the heated metal core material is pressurized by pressure of winding the refrigerant pipe around the ice-making tube, to completely fill the spiral space with the heated metal core material, or to form a uniform interval in the spiral space.

In addition, in the method according to an embodiment of the present disclosure, a metal core material having a cross-sectional shape and a thickness, corresponding to a diameter of a cross-sectional shape of the spiral space, may feed.

In the method according to an embodiment of the present disclosure, in the heating and feeding the metal core material to the ice-making tube or the heating a welding agent through an internal space of the ice-making tube, the metal core material or the internal space of the ice-making tube may be heated by irradiating high-frequency light thereonto.

In the method according to an embodiment of the present disclosure, in the winding the metal core material together with the refrigerant pipe on the ice-making tube, the refrigerant pipe provided horizontally may be wound by rotating the fixed ice-making tube, and the metal core material positioned between one portion of and the other portion of the refrigerant pipe, adjacent to each other and to the ice-making tube, may be provided below the refrigerant pipe.

In the method according to an embodiment of the present disclosure, in the heating and feeding the metal core material to the ice-making tube, the metal core material may be heated to less than a melting point of the metal core material before positioning the metal core material between adjacent portions of the refrigerant pipe, and the heated metal core material may be provided between the refrigerant pipe and the ice-making tube.

In the method according to an embodiment of the present disclosure, the heating a welding agent through an internal space of the ice-making tube to perform adhesion between the metal core material and both of the refrigerant pipe and the ice-making tube, may include inserting a high-frequency heating unit into the internal space of the ice-making tube; and positioning and rotating the ice-making tube at a constant speed such that the metal core material does not flow out therefrom and is bonded with both of the refrigerant pipe and the ice-making tube.

According to an aspect of the present disclosure, an auger-type ice maker manufactured using the above-described method may be provided.

In the auger-type ice maker according to an embodiment of the present disclosure, the metal core material disposed in the spiral space may fill and connect the refrigerant pipe and the ice-making tube without gaps.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
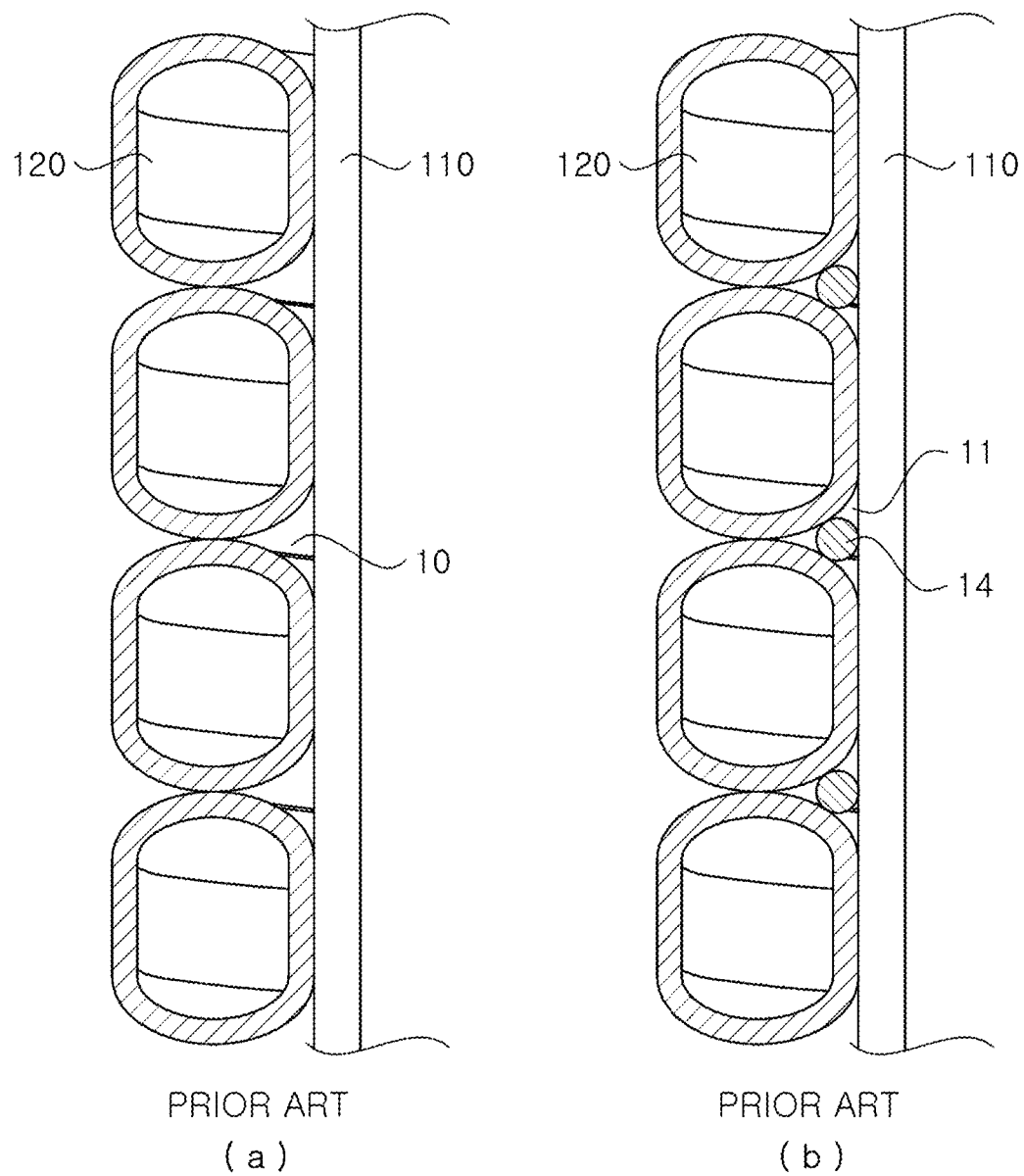
FIG. 1 is a view schematically illustrating a portion of an ice-making unit of an auger-type ice maker of the prior art.

Embodiments described in the specification of the present disclosure and configurations illustrated in the drawings correspond to a preferred embodiment of the present disclosure, and do not represent all of the technical spirit of the present disclosure. Therefore, it should be understood that various equivalents capable of being substituted at the time of filing the present disclosure may be included.

Hereinafter, embodiments of the present disclosure will be described in detail with reference to the accompanying drawings according to the present disclosure. In describing the present disclosure, names and symbols of components performing the same functions as those of the prior art may be used in the same manner.

Figure 2:
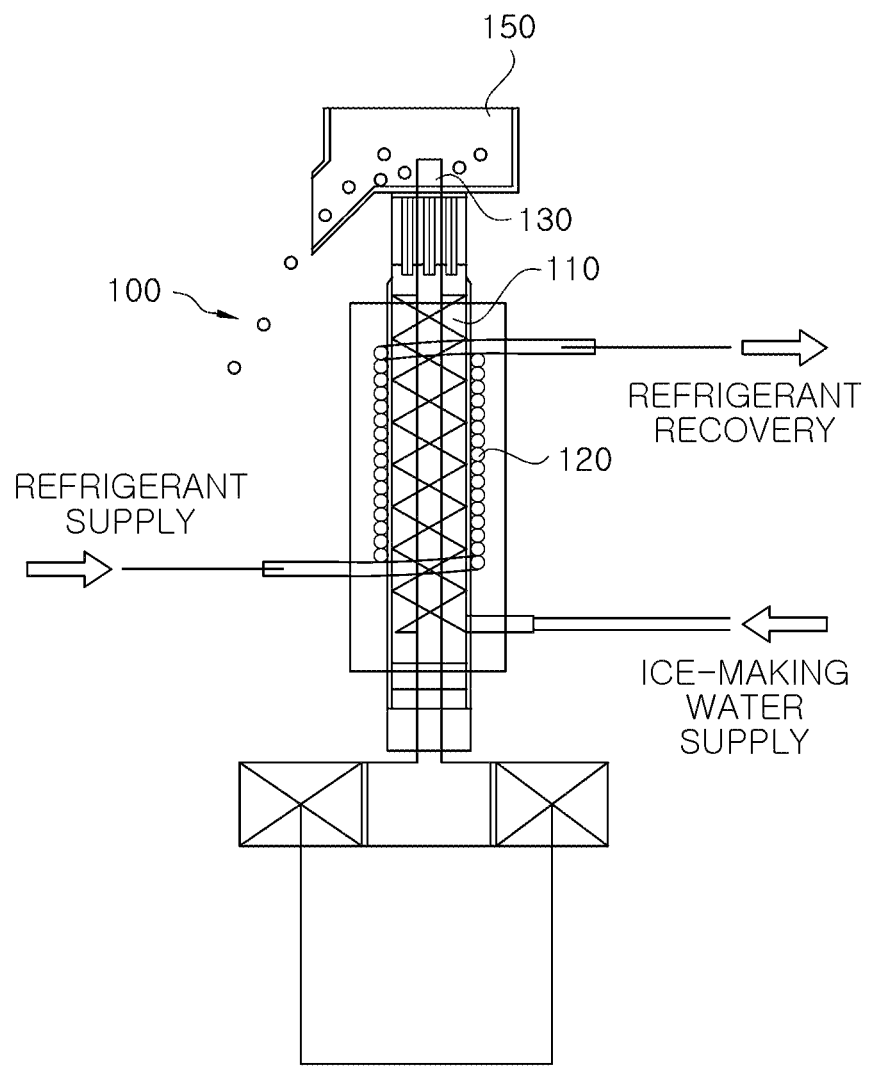
FIG. 2 is a configuration diagram schematically illustrating a configuration of an auger-type ice maker according to an embodiment of the present disclosure.

FIG. 2 is a configuration diagram schematically illustrating a configuration of an auger-type ice maker according to an embodiment of the present disclosure.

As illustrated in FIG. 2, an ice-making unit 100 of an auger-type ice maker may be equipped with an auger 130 rotating by a lower motor, in an internal space of an ice-making tube 110 having a stainless steel material, installed vertically, and a refrigerant pipe 120 formed to have a tight coil spring shape may be mounted on an outer circumferential surface of the ice-making tube 110.

Then, while supplying ice-making water stored in a water tank to the ice-making tube 110, a refrigerant may be circulated through the refrigerant pipe 120, and the auger 130 may rotate to transfer slush ice generated in the ice-making tube 110 to an upper outlet of the ice-making tube 110, and ice formed during an ice-making operation may be discharged to an ice storage 150 as an ice chunk.

For example, an auger-type ice maker according to an embodiment of the present disclosure may include an ice-making unit 100 circulating and suppling ice-making water and a refrigerant to perform an ice-making operation, and an ice-making unit 100 according to an embodiment of the present disclosure may include an ice-making tube 110, an auger 130 installed coaxially in the ice-making tube 110, a refrigerant pipe 120 spirally wound around and tightly fixed to an outer surface of the ice-making tube 110, and a metal core material 140 filling a spiral space 141 formed between the ice-making tube 110 and the spirally wound refrigerant pipe 120 adjacent to the ice-making tube.

Figure 3:
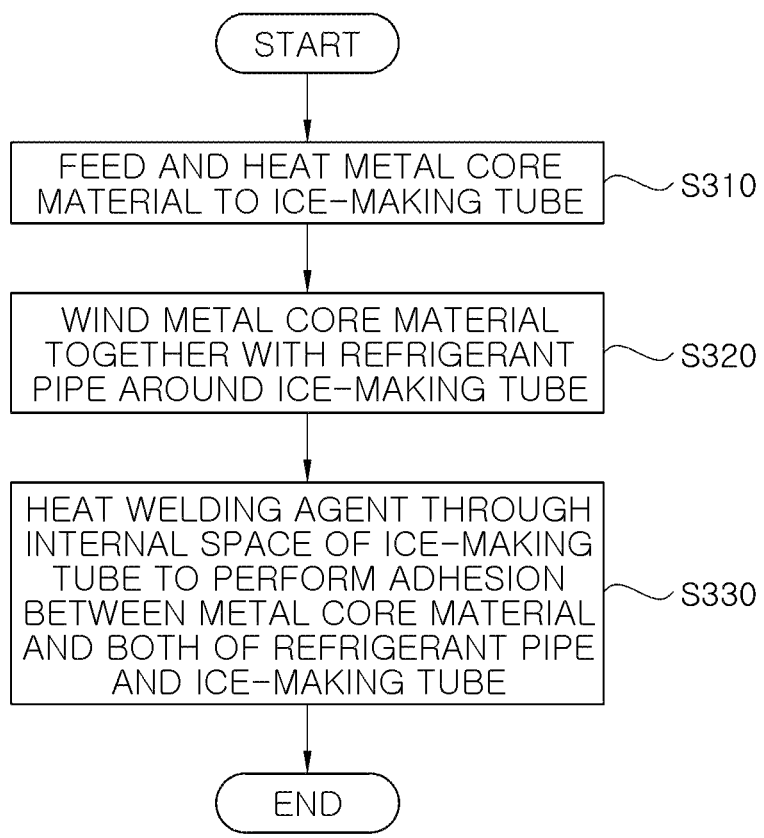
FIG. 3 is a flowchart illustrating a method of manufacturing an auger-type ice maker according to an embodiment of the present disclosure.
Figure 4:
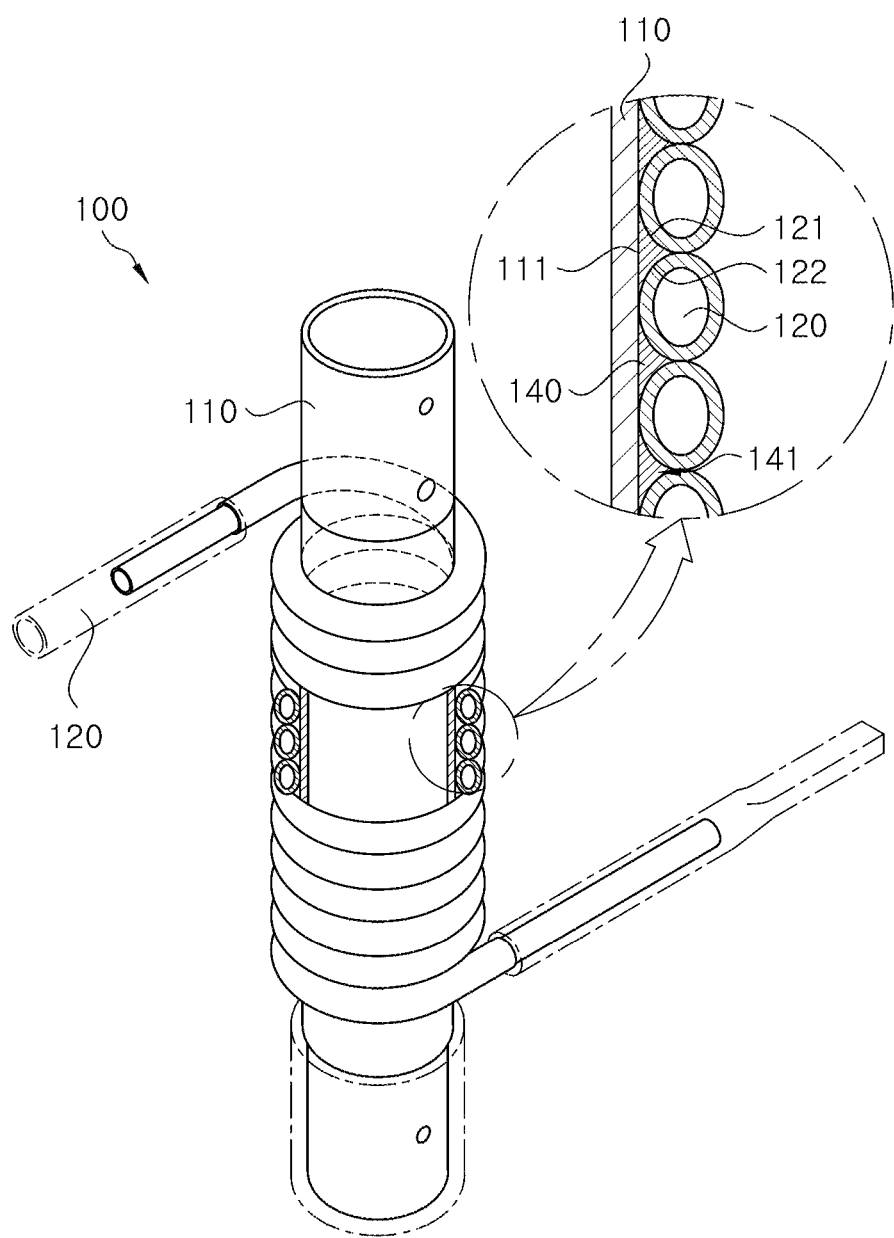
FIG. 4 is a configuration diagram schematically illustrating a configuration of an ice-making unit of an auger-type ice maker manufactured according to a method of manufacturing an auger-type ice maker according to an embodiment of the present disclosure.

FIG. 3 is a flowchart illustrating a method of manufacturing an auger-type ice maker according to an embodiment of the present disclosure, and FIG. 4 is a configuration diagram schematically illustrating a configuration of an ice-making unit 100 of an auger-type ice maker manufactured according to a method of manufacturing an auger-type ice maker according to an embodiment of the present disclosure.

As illustrated in FIG. 3, a method of manufacturing an ice-making unit 100 of an auger-type ice maker according to an embodiment of the present disclosure may include heating and feeding a metal core material 140 to an ice-making tube 110 (S310), winding the metal core material 140 together with a refrigerant pipe 120 around the ice-making tube 110 (S320), and heating a welding agent through an internal space of the ice-making tube 110 to perform adhesion between the metal core material 140 and both of the refrigerant pipe 120 and the ice-making tube 110 (S330).

In addition, in S320 of winding the metal core material 140 together with a refrigerant pipe 120 around the ice-making tube 110, the heated metal core material 140 may be pressurized by pressure of winding the refrigerant pipe 120 around the ice-making tube 110, to completely fill a spiral space 141 with the heated metal core material 140.

For example, as an embodiment, the metal core material 140 may fill the spiral space 141 with a uniform pressure using pressure for spirally winding the refrigerant pipe 120 around the ice-making tube 110 provided with the welding agent. Therefore, it is possible to completely contact the ice-making tube 110 and the refrigerant pipe 120 without an empty space, or to form a uniform and constant gap.

In this case, heat may be additionally provided to bond the ice-making tube 110 and the refrigerant pipe 120 by the welding agent, and the pressurized metal core material 140 may form a uniform and constant gap or may completely bond the ice-making tube 110 and the refrigerant pipe 120, to maximize bonding efficiency, and as a result, ice-making performance may be improved.

Specifically, as illustrated in FIG. 4, a refrigerant pipe 120 spirally wound with respect to an ice-making tube 110 having a cylindrical shape may be disposed such that one portion of and the other portion of the refrigerant pipe 120 are adjacent to each other in a vertical direction. As above, a refrigerant may be supplied to one end of the refrigerant pipe 120, and the refrigerant may be recovered from the other end of the refrigerant pipe 120.

In this case, a first surface 121 of one portion of the refrigerant pipe 120, adjacent to a portion of the ice-making tube 110, and a second surface 122 of the other portion of the refrigerant pipe 120, adjacent to the portion of the ice-making tube 110, and one surface 111 of the ice-making tube 110 surrounded by the first surface 121 and the second surface 122 may form a spiral space 141.

In S320 according to an embodiment of the present disclosure, when a metal core material 140 is spirally wound around the ice-making tube 110 together with the refrigerant pipe 120, the ice-making tube 110, the metal core material 140, and the refrigerant pipe 120 may be arranged in sequence. In this case, the metal core material 140 may be pressurized using pressure applied by the refrigerant pipe 120, together, to the ice-making tube 110, and a shape of the metal core material 140 may be changed according to a shape and a volume of the spiral space 141 formed by the first surface 121, the second surface 122, and the one surface 111 of the ice-making tube 110.

As illustrated in FIG. 4, an ice-making unit 100 may include the spiral space 140 completely filled by the metal core material 140, to arrange between the ice-making tube 110 and the refrigerant pipe 120 in a constant and uniform state. As a space between the ice-making tube 110 and the refrigerant pipe 120 may be filled without an empty space, heat conduction performance may be secured, thereby improving cooling efficiency and ice-making performance.

In addition, according to an embodiment of the present disclosure, in S310 of heating and feeding a metal core material 140 to an ice-making tube 110 such that the shape of the metal core material 140 is more easily changed by the pressure applied by the refrigerant pipe 120 to the ice-making tube 110, the metal core material 140 may be heated by irradiating high-frequency light thereonto.

A strong high-frequency electromagnetic field may be disposed to heat an object, and induction heating may be performed to heat the metal core material 140.

Specifically, in S310 of heating and feeding a metal core material 140 to an ice-making tube 110, according to an embodiment of the present disclosure, the metal core material 140 may be heated to less than a melting point of the metal core material 140 before positioning the metal core material 140 between adjacent portions of the refrigerant pipe 120, and the heated metal core material 140 may be provided between the refrigerant pipe 120 and the ice-making tube 110.

In addition, according to an embodiment of the present disclosure, a metal core material 140 having a cross-sectional shape and a thickness, corresponding to a diameter of a cross-sectional shape of the spiral space 141, may feed, such that the metal core material 140 fills the spiral space 141 by pressure applied by the refrigerant pipe 120 to the ice-making tube 110. Thereby, the refrigerant pipe 120 and the ice-making tube 110 may be in complete contact to maximize heat transfer performance.

In this case, in S320 of winding the metal core material 140 together with a refrigerant pipe 120 around the ice-making tube 110, according to an embodiment of the present disclosure, the refrigerant pipe 120 provided horizontally may be wound by rotating the fixed ice-making tube 110, and the metal core material 140 positioned between one portion of and the other portion of the refrigerant pipe 120, adjacent to each other and to the ice-making tube, may be provided below the refrigerant pipe 120.

The ice-making tube 110 may be positioned and rotate to be perpendicular to a direction in which the refrigerant pipe 120 is wound around the ice-making tube 110, to prevent for the metal core material 140, which is heated and approached the melting point, from flowing down or escaping through the spiral space 141.

In S330 of heating a welding agent through an internal space of the ice-making tube 110 to perform adhesion between the metal core material 140 and both of the refrigerant pipe 120 and the ice-making tube 110, the internal space of the ice-making tube 110 may be heated by irradiating high-frequency light thereonto.

Specifically, S330 may include inserting a high-frequency heating unit into the internal space of the ice-making tube 110, and positioning and rotating the ice-making tube 110 at a constant speed such that the metal core material 140 does not flow out therefrom and is bonded with both of the refrigerant pipe 120 and the ice-making tube 110.

Even though the heated metal core material 140 and the refrigerant pipe 120 are wound with the welding agent applied to an outer surface of the ice-making tube 110, the welding agent may not be heated to a temperature at which adhesive force may be exerted. Therefore, thermal energy may be required to bond the ice-making tube 110, the refrigerant pipe 120, and the metal core material 140, and a high-frequency heating unit having a long bar shape may be inserted into the ice-making tube 110 to effectively transfer heat. Thus, heat may be transferred the internal space of the ice-making tube 110, and the transferred heat may heat the welding agent on the outer surface of the ice-making tube 110 to perform bonding.

In this case, inertia may be provided by rotating the ice-making tube 110 at a constant speed such that the metal core material 140 does not flow down or melt.

Figure 5:
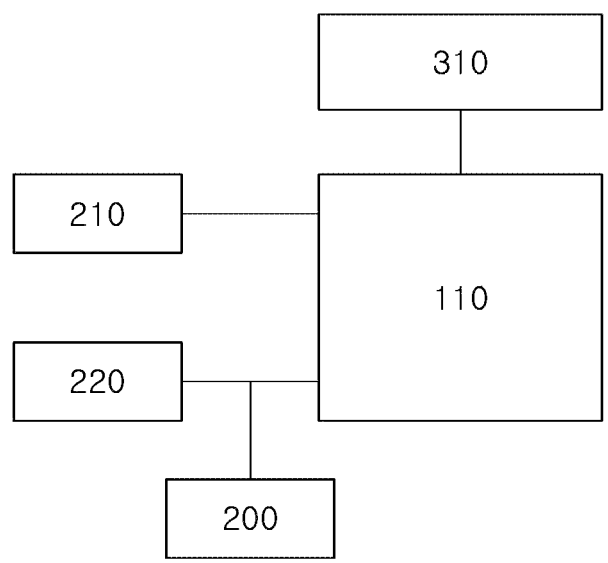
FIG. 5 is a block diagram of an apparatus for performing a method of manufacturing an auger-type ice maker according to an embodiment of the present disclosure.
Figure 6:
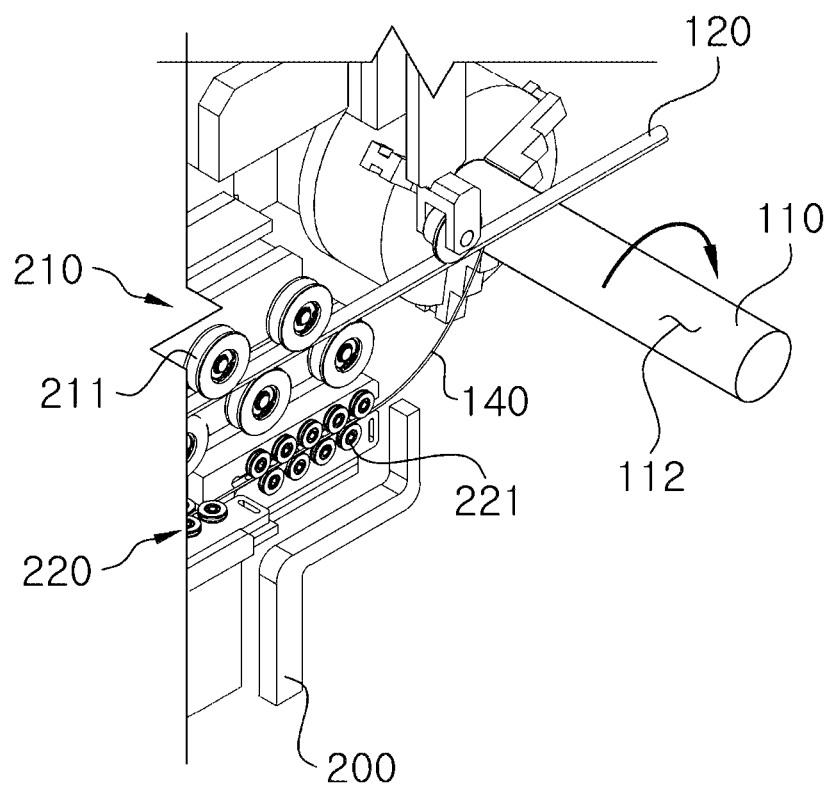
FIG. 6 is a perspective view of an apparatus for performing a method of manufacturing an auger-type ice maker according to another embodiment of the present disclosure.

FIGS. 5 and 6 are a block diagram and a perspective view, respectively, of an apparatus for performing a method of manufacturing an auger-type ice maker according to an embodiment of the present disclosure, and a method of manufacturing an ice-making unit 100 of the auger-type ice maker will be described in detail through FIGS. 5 and 6.

As illustrated in FIGS. 5 and 6, an apparatus for performing a method of manufacturing an auger-type ice maker according to an embodiment of the present disclosure may include a rotation driver 310 for rotating an ice-making tube 110 to wind a refrigerant pipe 120 or a metal core material 140 around the ice-making tube 110, a refrigerant pipe supplier 210 for supplying the refrigerant pipe 120 to be wound around the ice-making tube 110, and a metal core material supplier 220 for supplying the metal core material 140 below the refrigerant pipe supplier 210.

As illustrated in FIG. 5, the refrigerant pipe supplier 210 may be disposed on one side of the ice-making tube 110, and may supply the refrigerant pipe 120 to the ice-making tube 110, and the metal core material supplier 220 may be disposed on one side of the ice-making tube 110 and below the refrigerant pipe supplier 210, to supply the metal core material 140 to the ice-making tube 110.

As an embodiment, when the refrigerant pipe supplier 210 supplies the refrigerant pipe 120 to the ice-making tube 110 horizontally from left side to right side, the rotation driver 310 may wind the refrigerant pipe 120 around the ice-making tube 110 while rotating the ice-making tube 110, and when the metal core material supplier 220 supplies the metal core material 140 between the refrigerant pipe 120 and the ice-making tube 110, the rotation driver 310 may wind the metal core material 140 around the ice-making tube 110 with the refrigerant pipe 120 together, while rotating the ice-making tube 110.

In this case, a high-frequency heater 200 may be disposed below the metal core material 140 supplied by the metal core material supplier 220 to the ice-making tube 110, to supply heat to the metal core material 140, before being pressurized by pressure by which the refrigerant pipe 120 is wound around the ice-making tube 110.

Specifically, as illustrated in FIG. 6, the refrigerant pipe supplier 210 may supply the refrigerant pipe 120 horizontally through first rollers 211, and the metal core material supplier 220 may supply the metal core material 140 through second rollers 221, to be inclined below the refrigerant pipe 120. Although a second roller 221 is disposed horizontally in FIG. 6, the second roller 221 may be disposed to be inclined, to supply the metal core material 140 at an inclination. The refrigerant pipe 120 may be supplied horizontally, and the metal core material 140 may be disposed at an inclination in a lower portion, to be positioned to correspond to a spiral space 141.

The above-described suppliers 210 and 220 are merely illustrative, and any type of supplier supplying the refrigerant pipe 120 and the metal core material 140 together to the ice-making tube 110 may be applied.

In this case, as an embodiment, a high-frequency heater 200 for heating the metal core material 140 discharged from the metal core material supplier 220 on one side may be further disposed.

A position of the high-frequency heater 200 illustrated in FIG. 6 is illustrative, and may be a position in which the metal core material 140 is discharged from the metal core material supplier 220 and is heated immediately until the metal core material 140 is wound around the ice-making tube 110 together with the refrigerant pipe 120. The high-frequency heater 200 is also illustrated as being disposed below the metal core material supplier 220 in FIG. 6, but this is only illustrative, and the high-frequency heater 200 may be disposed wherever the high-frequency heater 200 can heat the metal core material 140 supplied before being wound around the ice-making tube 110, and a shape of the high-frequency heater 200 is not limited to the shape illustrated in FIG. 6.

Before positioning the metal core material 140 between one portion of and the other portion of the refrigerant pipe 120, adjacent to each other and to a portion of the ice-making tube, the metal core material 140 may be heated to less than a melting point of the metal core material 140, and the heated metal core material 140 may be provided between the refrigerant pipe 120 and the ice-making tube 110.

A heating temperature of the metal core material 140 may be controlled such that the metal core material 140 in which the spiral space 141 is fully disposed does not melt and flow out.

Alternatively, as an embodiment, heating may be performed while rotating the ice-making tube 110 around which the refrigerant pipe 120 and the metal core material 140 are wound.

While rotating the ice-making tube 110 at a constant speed, an inertial force may be generated to control the metal core material 140 not to melt and flow out.

Figure 7:
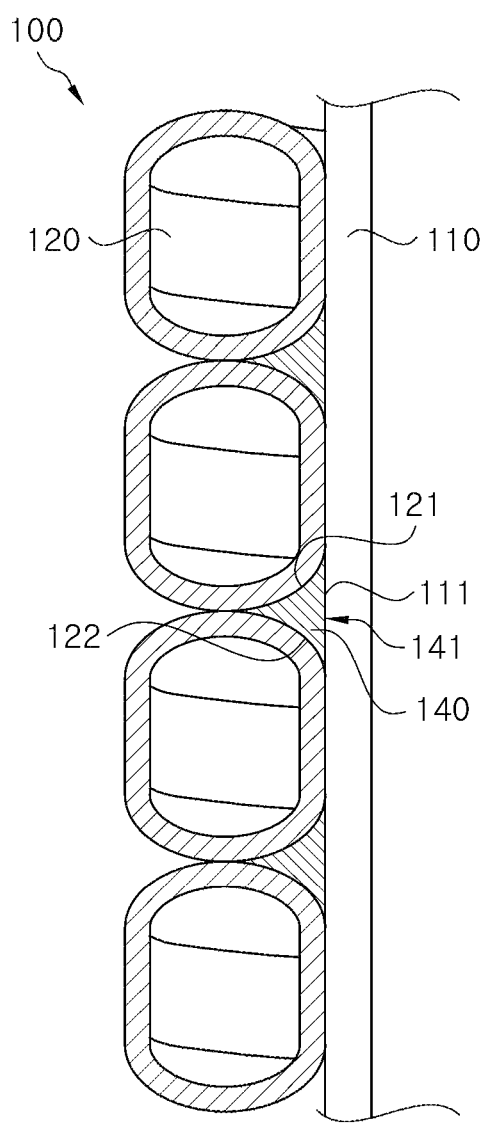
FIG. 7 is a view schematically illustrating a portion of an ice-making unit of an auger-type ice maker according to an embodiment of the present disclosure.

FIG. 7 is a view schematically illustrating a portion of an ice-making unit 100 of an auger-type ice maker according to an embodiment of the present disclosure.

When an auger-type ice maker manufactured using the above-described method for manufacturing an auger-type ice maker is manufactured, an ice-making unit 100 of the auger-type ice maker may include an ice-making tube 110, a refrigerant pipe 120, and a metal core material 140, as illustrated in FIG. 7.

In this case, the metal core material 140 disposed in a spiral space 141 may fill and connect the refrigerant pipe 120 and the ice-making tube 110 without a gap.

A metal core material 140 having a cross-sectional shape and a thickness, corresponding to a diameter of a cross-sectional shape of the spiral space 141, may be heated to a constant temperature and may then be fed, to pressurize the metal core material 140 by pressure of winding the refrigerant pipe around the ice-making tube, to obtain a metal core material 140 corresponding to a shape of a spiral space 141, formed by a first surface 121 of one portion of the refrigerant pipe 120, adjacent to the ice-making tube 110, and a second surface 122 of the other portion of the refrigerant pipe 120, adjacent to the ice-making tube 110, and one surface 111 of the ice-making tube 110.

The metal core material 140 may completely fill the spiral space 141 as a metal bonding portion connecting the ice-making tube 110 and the refrigerant pipe 120, and there may be no gap between the refrigerant pipe 120 and the ice-making tube 110, to maximize heat transfer performance.

In addition, the metal core material 140 may be deformed to fit the spiral space 141 by a process of winding the refrigerant pipe 120 around the ice-making tube 110 without going through a separate molten lead immersion process or a separate molten lead input process, to increase operation efficiency and promote operator convenience.

According to an embodiment of the present disclosure, since a gap between an ice-making tube and a refrigerant pipe may be constantly and uniformly formed, bonding may be performed even only by a simple bonding process, a spiral space may be filled without an empty space during a process of winding the refrigerant pipe on the ice-making tube, without performing an additional molten lead immersion process or installing a separate bonding structure, and the ice-making tube and the refrigerant pipe may be completely bonded without gaps to improve cooling efficiency or ice-making performance of an ice maker.

While example embodiments have been illustrated and described above, it will be apparent to those skilled in the art that modifications and variations could be made without departing from the scope of the present disclosure as defined by the appended claims.

What is claimed is:

1. A method for manufacturing an auger-type ice maker including an ice-making tube, an auger installed coaxially in the ice-making tube, a refrigerant pipe spirally wound around and tightly fixed to an outer surface of the ice-making tube, and a metal core material filling a spiral space formed between the ice-making tube and the refrigerant pipe adjacent to the ice-making tube, comprising:

heating and feeding the metal core material to the ice-making tube;

winding the metal core material together with the refrigerant pipe around the ice-making tube; and heating a welding agent through an internal space of the ice-making tube to perform adhesion between the metal core material and both of the refrigerant pipe and the ice-making tube, wherein, in the winding the metal core material together with the refrigerant pipe on the ice-making tube, the heated metal core material is pressurized by pressure of winding the refrigerant pipe around the ice-making tube, to completely fill the spiral space with the heated metal core material, or to form a uniform interval in the spiral space.

2. The method of claim 1, wherein a metal core material having a cross-sectional shape and a thickness, corresponding to a diameter of a cross-sectional shape of the spiral space, feeds.

3. The method of claim 1, wherein, in the heating and feeding the metal core material to the ice-making tube or the heating a welding agent through an internal space of the ice-making tube, the metal core material or the internal space of the ice-making tube is heated by irradiating high-frequency light thereonto.

4. The method of claim 1, wherein, in the winding the metal core material together with the refrigerant pipe on the ice-making tube, the refrigerant pipe provided horizontally is wound by rotating the fixed ice-making tube, and the metal core material positioned between one portion of and the other portion of the refrigerant pipe, adjacent to each other and to the ice-making tube, is provided below the refrigerant pipe.

5. The method of claim 4, wherein, in the heating and feeding the metal core material to the ice-making tube, the metal core material is heated to less than a melting point of the metal core material before positioning the metal core material between the adjacent portions of the refrigerant pipe, and the heated metal core material is provided between the refrigerant pipe and the ice-making tube.

6. The method of claim 1, wherein the heating a welding agent through an internal space of the ice-making tube to perform adhesion between the metal core material and both of the refrigerant pipe and the ice-making tube, comprises:

inserting a high-frequency heater into the internal space of the ice-making tube; and positioning and rotating the ice-making tube at a constant speed such that the metal core material does not flow out therefrom and is bonded with both of the refrigerant pipe and the ice-making tube.

* * * * *